United States Patent
Yun et al.

(10) Patent No.: US 6,360,080 B1
(45) Date of Patent: Mar. 19, 2002

(54) DEVICE AND METHOD FOR COMMUNICATING POWER CONTROL BIT PATTERN ACCORDING TO TRANSMIT ANTENNA IN MOBILE COMMUNICATION SYSTEM

(75) Inventors: Yu-Suk Yun; Jae-Min Anh; Soon-Young Yoon, all of Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/332,671

(22) Filed: Jun. 14, 1999

(30) Foreign Application Priority Data

Jun. 12, 1998 (KR) .............................................. 98-22638

(51) Int. Cl.$^7$ ................................................. H04B 1/00
(52) U.S. Cl. ......................... 455/70; 455/103; 455/522
(58) Field of Search ................................. 455/101, 103, 455/105, 562, 70, 135, 561, 522, 525; 375/267, 299, 347; 370/335, 347

(56) References Cited

U.S. PATENT DOCUMENTS 6,151,328 A * 11/2000 Kwon et al. ................. 370/441
6,185,266 B1 * 2/2001 Kuchi et al. ................. 455/135

* cited by examiner

*Primary Examiner*—Nay Maung
*Assistant Examiner*—Sonny Trinh
(74) *Attorney, Agent, or Firm*—Dilworth & Barrese, LLP

(57) ABSTRACT

In a device for communicating data between a base station having at least two transmit antennas, and a mobile station having at least one receive antenna in a mobile communication system, the device includes: a transmitter at the base station, for inserting power control bit (PCB) patterns into the data and sending the data with the PCB patterns inserted therein, the PCB patterns indicating one transmit antenna being used to transmit the data; and a receiver at the mobile station, for receiving the data, detecting the PCB patterns from the received data and determining the one transmit antenna from the detected PCB patterns.

22 Claims, 2 Drawing Sheets

DEVICE AND METHOD FOR COMMUNICATING POWER CONTROL BIT PATTERN ACCORDING TO TRANSMIT ANTENNA IN MOBILE COMMUNICATION SYSTEM

BACKGROUND OF THE INVENTION

1. Field of the Invention

The present invention relates generally to a mobile communication system and, more particularly, to a device and method for transmitting power control bit patterns to allow a mobile station to distinguish a transmit antenna in a mobile communication system that employs transmission diversity.

2. Description of the Related Art

Transmit antenna diversity techniques are generally characterized by three features: (1) a base station simultaneously sends common pilot signals to a mobile station wherein each common pilot signal uses a different spreading sequence in accordance with a particular transmit antenna at the base station (2) one user's data signal is transmitted via only one antenna among the plurality of antennas; and (3) the mobile station must have some prior knowledge about the identity of the transmit antenna that the base station is currently using to transmit the user's data to the mobile station. If the mobile station does not have such knowledge it must otherwise correctly estimate the identity of the transmit antenna.

With regard to the third feature, as previously stated, the mobile station must have some prior knowledge about the identity of the antenna currently used by the base station for data transmission, or otherwise be able to estimate the antenna's identity by means of received signals from the base station. In either case, it is necessary for the base station to send to the mobile station supplementary information about the transmit antenna.

Conventionally, the method for sending supplementary information about the transmit antenna involves the use of user-specific pilot symbols at the base station. As is well known in the art, communication systems that use pilot signals may be generally divided into two classes: a first class whereby different pilot signals are used according to each user communicating with the base station, and a second class whereby a common pilot channel is shared by all users. The common pilot channel system cannot be used to send information about the transmit antenna, since it is shared by all users.

It is generally known that to perform reverse link power control, the base station, after puncturing a data signal, inserts a power control bit (PCB) in the punctured data signal and transmits the modified signal to the mobile station. The present invention discloses a method which exploits the existing PCB bit insertion method to provide additional information to the mobile station about the transmit antenna to facilitate the implementation of transmission antenna diversity.

SUMMARY OF THE INVENTION

It is, therefore, an object of the present invention to provide a device and method for generating a different PCB pattern according to a transmit antenna and communicating the generated PCB pattern in a mobile communication system employing the transmit antenna diversity technique.

To achieve the above object of the present invention, there is provided a device and an associated method for communicating data between a base station having at least two transmit antennas, and a mobile station having at least one receive antenna in a mobile communication system, the device includes: a transmitter at the base station, for inserting power control bit (PCB) patterns into the data and sending the data with the PCB patterns inserted therein, the PCB patterns indicating one transmit antenna being used to transmit the data; and a receiver at the mobile station, for receiving the data, detecting the PCB patterns from the received data and determining the one transmit antenna from the detected PCB patterns.

BRIEF DESCRIPTION OF THE DRAWINGS

The above and other objects, features and advantages of the present invention will become more apparent from the following detailed description when taken in conjunction with the accompanying drawings in which like reference numerals indicate like parts. In the drawing.

DETAILED DESCRIPTION OF THE PREFERRED EMBODIMENT

A preferred embodiment of the present invention will be described hereinbelow with reference to the accompanying drawings. In the following description, well known functions or constructions are not described in detail since they would obscure the invention in unnecessary detail.

Overview

In a mobile communication system that employs the transmit antenna diversity technique, the mobile station must have correct information about the particular transmit antenna used to transmit data at the base station in order to perform a successful data modulation. And if the mobile station could identify the transmit antenna, the mobile station could send antenna select signal to the base station which is service to the mobile station. To accomplish this, the present invention enables the mobile station to identify the transmit antenna by using an identifying PCB pattern which is inserted in the punctured data during data transmission. The PCB pattern is generated by modulating PCT with specific bit pattern, for example orthogonal code. The present invention is advantageous in that it precludes the need to use control signals separately exchanged between the base station and the mobile station in order to acquire information about the transmit antenna.

Generally described, the transmitter sends one of a plurality of PCB patterns to the mobile station. The particular PCB pattern transmitted corresponds to the antenna being currently used by the base station to transmit the data. Each PCB pattern is associated with one of the transmit antennas and each pattern has the property of being orthogonal with every other PCB pattern thereby permitting the mobile station to readily identify the corresponding transmit antenna. The receiver extracts the PCB pattern using the orthogonality property of the PCB patterns so as to obtain both power control information and transmit antenna information.

Briefly summarized, the present invention transmits supplementary information about the transmit antenna being currently used to transmit the data signal to the mobile by the base station by means of the PCB pattern inserted in the punctured transmission data. In particular, the base station, after puncturing transmission data, inserts a PCB in the punctured data and transmits the data to the mobile station, in order to perform reverse link power control. The method has applicability for those situations where the transmit antenna is not aware of the particular transmit antenna being currently used for data transmission by a base station. The method has applicability to both a mobile communication system configured as a common pilot channel structure.

Detailed Description

Figure 1:
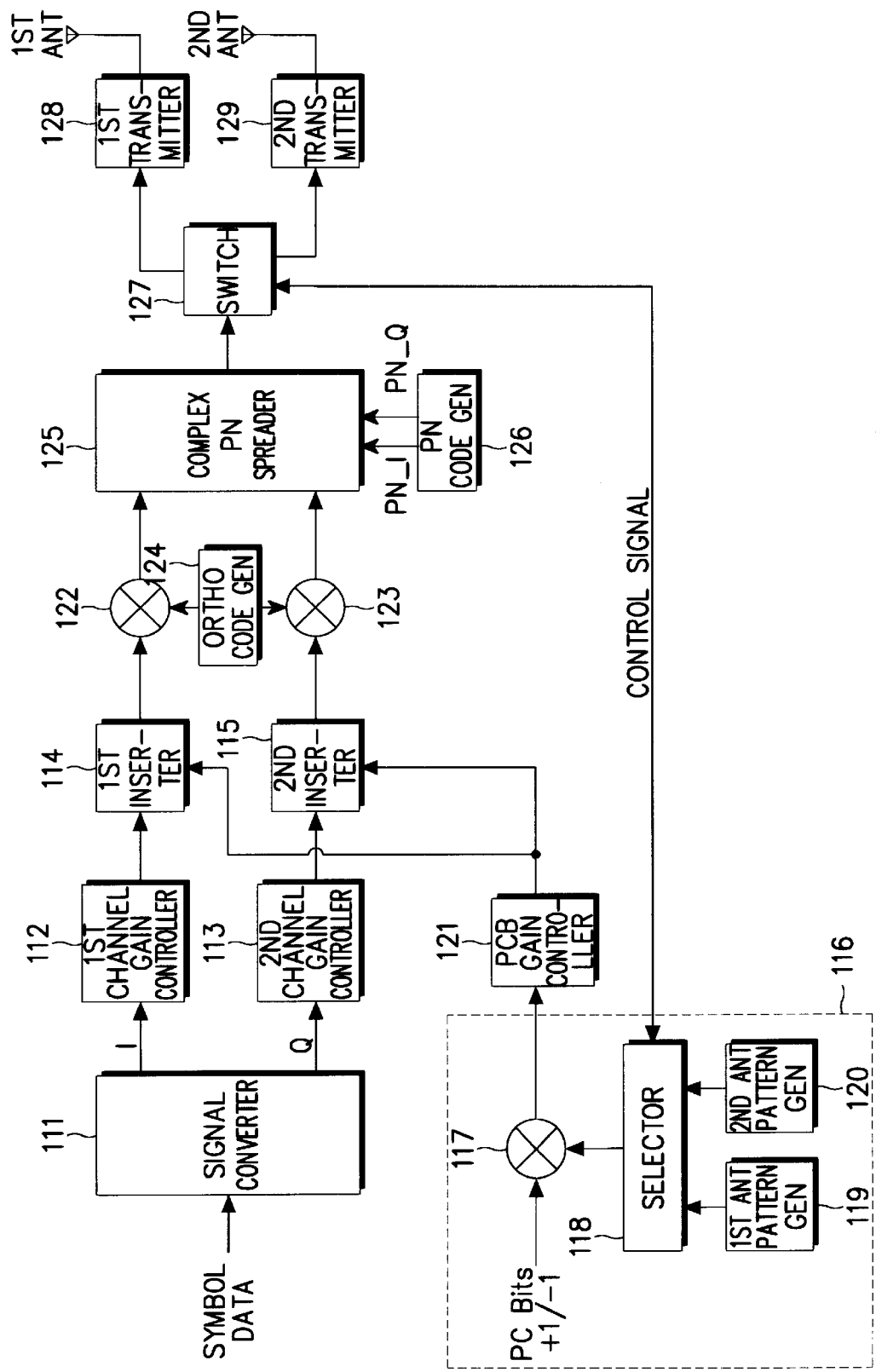
FIG. 1 is a block diagram illustrating a device for use in a mobile communication system for generating at a base station, a PCB pattern corresponding to a transmit antenna according to an embodiment of the present invention.

FIG. 1 is a diagram illustrating a device for generating, at the base station, a different PCB pattern according to a transmit antenna and sending the generated PCB pattern to the mobile station in a mobile communication system according to an embodiment of the present invention.

Referring to FIG. 1, a signal converter 111 demultiplexes input code symbol into an inphase channel (I-channel) and a quadrature channel (Q-channel) and outputs the multiplexed data as first and second channel signals. Also, the signal converter 111 converts the level of symbol data, i.e., from "0" to "+1" and from "1" to "−1". Here, the coded symbol input into the signal converter 111 is symbol data received through encoders and interleavers, etc.

A first channel gain controller 112 receives the first channel signal (i.e. I channel) from the signal converter 111 and controls the gain of the first channel signal according to a gain control signal. A second channel gain controller 113 receives the second channel signal (i.e. Q channel) from the signal converter 111 and controls the gain of the second channel signal according to a second gain control signal.

A PCB pattern generator module 116 includes a multiplier 117, a selector 118, and first and second antenna pattern generators 119 and 120. The PCB pattern generator 116 generates a different PCB pattern according to the transmit antenna being currently used for transmitting the coded symbol by the base station. The first and second antenna pattern generators 119 and 120 generate PCB patterns for the first and second antennas, respectively, and output the generated antenna patterns to the selector 118. Here, orthogonality between the respective antenna patterns is maintained. The selector 118 selects a pattern for the transmit antenna that is currently used for data transmission. The multiplier 117 multiplies the PCB ("1" or "−1") by the output of the selector 118, i.e., the selected antenna pattern.

A PCB gain controller 121 receives the PCB multiplied by the antenna pattern output from the PCB pattern generator 116 and controls the gain of the PCB according to a gain control signal.

A first inserter 114 receives the outputs of the first channel gain controller 112 and the PCB gain controller 121. The first inserter 114 punctures data at a predetermined position of the output signal of the first channel gain controller 112 based on the selection of a bit selector (not shown) and then inserts the PCB pattern output from the PCB gain controller 121 in the punctured position. A second inserter 115 receives the outputs of the second channel gain controller 113 and the PCB gain controller 121. The second inserter 115 punctures data at a predetermined position of the output signal of the second channel gain controller 113 based on the selection of the bit selector and then inserts the PCB pattern output from the PCB gain controller 121 in the punctured position.

An orthogonal code generator 124 generates orthogonal codes used for channelization corresponding to the orthogonal code number "W#" (i.e. W0, W1, W2, . . . etc. ) and the orthogonal code length. Here, the orthogonal codes may be Walsh codes or quasi-orthogonal codes. A multiplier 122 multiplies the first channel signal output from the first inserter 114 by the orthogonal codes so as to generate an orthogonally modulated first channel signal. A multiplier 123 multiplies the second channel signal output from the second inserter 115 by the orthogonal codes so as to generate an orthogonally modulated second channel signal.

A PN code generator 126 generates two PN codes PN_I and PN_Q and outputs them to a complex PN spreader 125. The complex PN spreader 125 complex-number multiplies the outputs of the multipliers 122 and 123 by the PN codes PN_I and PN_Q. A switch 127 is used to implement the transmit antenna diversity technique so as to transmit the output signal of the complex PN spreader 125 to first and second transmitters 128 and 129 in accordance with a control signal for transmit antenna diversity. The first and second transmitters 128 and 129 perform an ordinary low-pass filtration for confining transmission signals to within a predetermined bandwidth; convert the low-pass filtered signals to radio frequency signals and then transmit the radio frequency signals to the corresponding antenna.

Now, reference will be made to the procedures at the base station for transmitting PCB patterns according to the data transmit antenna, in connection with FIG. 1.

The signal converter 111 divides the symbol data received via the encoder and interleaver into I-channel data and Q-channel data and converts the level of the transmission signal. That is, for the transmission signal, logic value "1" changes to "−1" and logic value "0" changes to "+1". The channel gain controllers 112 and 113 are data channel gain adders for adding gains according to the power control to input signals. The PCB pattern generator 116 generates a PCB pattern according to the transmit antenna being currently used for transmitting the data at the base station.

Next, a description of a method for generating the PCB patterns according to the data transmit antenna will be provided.

As is well known in the art, reverse link power control is a power control method whereby the mobile station controls its transmission power according to PCB patterns received from the base station. For example, upon receiving a PCB pattern of "+1+1", the mobile station would increase the transmission power; and upon receiving a PCB pattern of "−1−1", the mobile station would decrease its transmission power. As previously stated the PCB patterns are constructed to be orthogonal with each other. As such, each PCB uniquely identifies one of the transmission antennas deployed at the base station. For example, the PCB pattern that increases, or decreases, the transmission power for the mobile station received via the first antenna is determined by multiplying the PCB bit (+1 for an increase in power or −1 for a decrease in power) increasing, or decreasing, the transmission power for the mobile station by "+1+1" that corresponds to the first antenna pattern. In contrast, the PCB pattern that decreases (or increases) the transmission power for the mobile station received via the second antenna is determined by multiplying the PCB (+1 or −1) decreasing (or increasing) the transmission power for the mobile station by "+1−1" that corresponds to the second antenna pattern. As a result, the PCB patterns change according to the transmit antenna and have orthogonality with each other. That is, the PCB pattern generator according to the present invention generates the PCB patterns to be orthogonality with each other according to the transmit antenna.

For example, if the first antenna pattern is assumed to be "00", the second antenna pattern may be chosen to be "01" in order to maintain orthogonality between the PCB patterns. The outputs of the PCB pattern generator 116 are shown in Table 1.

TABLE 1

| Transmit Antenna | PCB | Output of PCB Pattern Generator |
|---|---|---|
| 1st Antenna | "+ 1 + 1" Transmission Power for Mobile Station Increased | + 1 + 1 |
| 2nd Antenna | "+ 1 + 1" Transmission Power for Mobile Station Increased | + 1 − 1 |
| 1st Antenna | "− 1 − 1" Transmission Power for Mobile Station Decreased | − 1 − 1 |
| 2nd Antenna | "− 1 − 1" Transmission Power for Mobile Station Decreased | − 1 + 1 |

When the PCBs are determined, the PCB gain controller 121 controls the gain of the PCBs output from the PCB pattern generator 116. The inserters 114 and 115 then insert the gain controlled PCBs in the data for the corresponding channels, respectively. That is, the inserters 114 and 115 puncture symbols at a predetermined position of the channel data and insert the PCBs in the punctured position. The multipliers 122 and 123 multiply the corresponding input channel signals by the orthogonal codes output from the orthogonal code generator 124, respectively. Here, the orthogonal codes may be Walsh codes or quasi-orthogonal codes.

The complex PN spreader 125 complex-number multiplexes the outputs of the multiplexers 122 and 123 by the PN codes PN_I and PN_Q, respectively. The switch 127 transfers the output signal of the complex PN spreader 125 to the first transmitter 128 or to the second transmitter 129 in accordance with a transmission diversity control signal. Finally, the first and second transmitters 128 and 129 convert the punctured transmission signal with the antenna-specific PCBs inserted therein, to a radio frequency signal, which is then sent to the corresponding antenna.

In general, when utilizing a transmit antenna diversity technique in a mobile communication system, all transmit antennas situated at the base station continuously send a pilot signal specific to each transmitting antenna. The mobile station receives the pilot signals from each of the transmit antennas. The mobile station checks on all the received pilot signals so as to determine whether the received signals from the antennas are of a high quality or not. That is, the mobile station checks on the quality of signals for all channels and requests the base station to communicate data on a high quality channel. Upon receipt of the request from the mobile station, the base station transmits data on the specific channel that the mobile station requested. However, some requests from the mobile station are not transferred successfully to the base station due to sudden impairment of the channel. Upon failure to receive the requests of the mobile station, the base station sends data to any antenna, since it has no knowledge about which channel can provide a high quality signal. As a result, the mobile station cannot demodulate the data using information about the desired transmit antenna and has to correctly estimate the transmit antenna from the data received from the base station.

The present invention such an estimation capability. That is, the present invention allows the mobile station to acquire knowledge about the antenna in current use by the base station. Such estimation capability is achieved by the base station sending a PCB pattern corresponding to the antenna being currently utilized to perform data transmission. The mobile station detects the received PCB pattern in order to acquire a knowledge about the antenna that the base station currently uses for data transmission.

Figure 2:
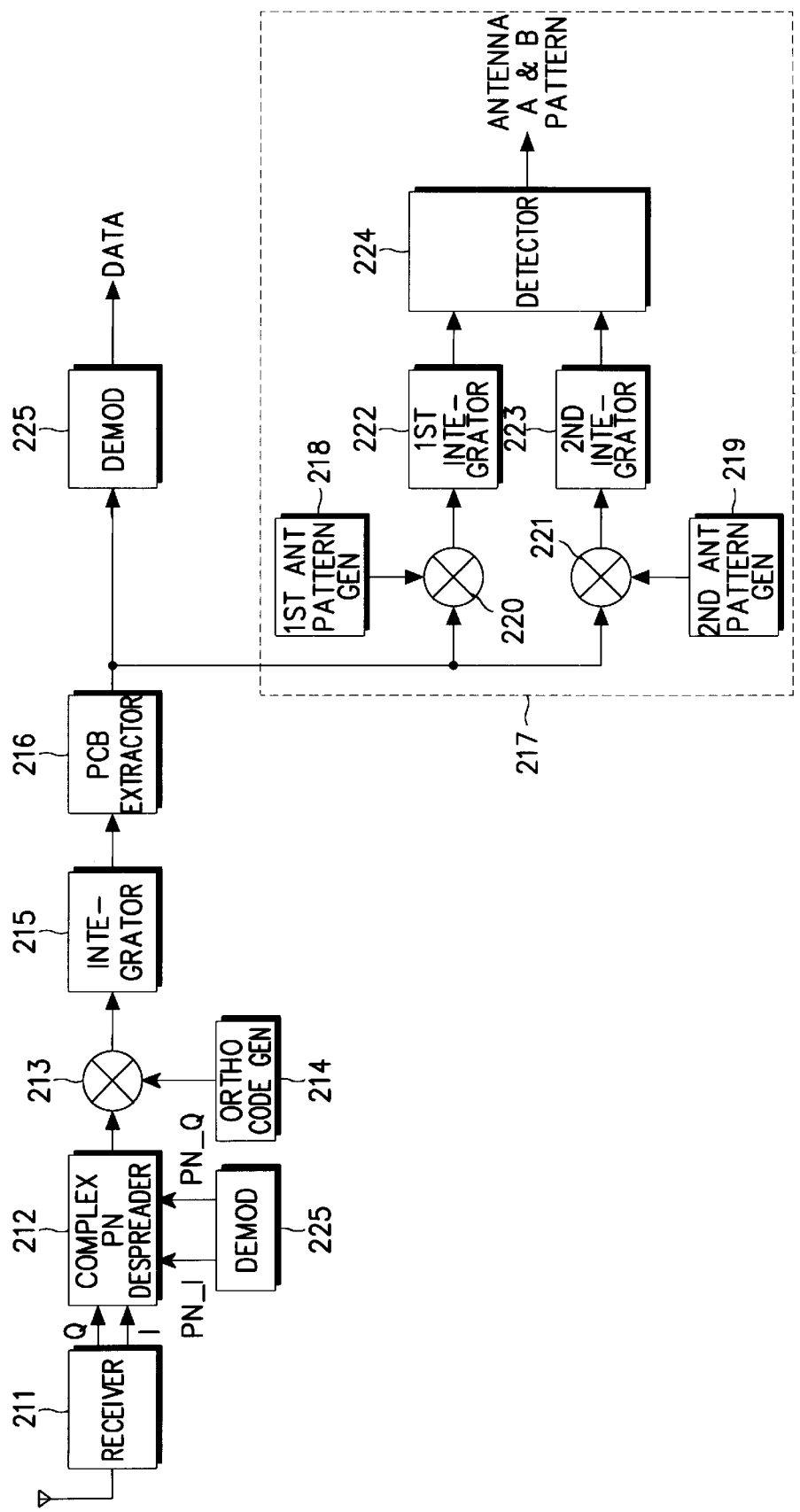
FIG. 2 is a block diagram illustrating a device for use in a mobile communication system for detecting at the mobile station, a PCB pattern contained within data received from the base station according to an embodiment of the present invention.

In connection with FIG. 2, reference will now be made to the description of a receiver at the mobile station for detecting a PCB pattern from received data and determining a data transmit antenna.

First, a receiver 211 converts a radio frequency signal, received from the base station via the antenna, to a base band signal. A PN code generator 225 generates two PN codes, PN_I and PN_Q and outputs them to a complex PN despreader 212. The complex PN despreader 212 performs a complex PN despread by complex-number multiplying the output of receiver 211 by the PN codes PN_I and PN_Q.

An orthogonal code generator 214 generates orthogonal codes corresponding to the orthogonal code number "W#" (i.e. W0, W1, W 2, . . . etc.) and the orthogonal code length. Here, the orthogonal codes may be Walsh codes or quasi-orthogonal codes. A multiplier 213 multiplies the output signal of the complex PN despreader 212 by the orthogonal codes generated from the orthogonal code generator 214 to perform an orthogonal despread.

An integrator 215 sums the output of the multiplier 213 for a period equal to a symbol interval to generate a value for symbol estimation. A PCB extractor 216 extracts a PCB signal from the output signal of the integrator 215 and outputs the extracted PCB signal to a PCB pattern generator 217. Also, the PCB extractor 216 sends the extracted PCB signal to a demodulator 225, which then demodulates the base band signal into a data signal. Here, the received signal is compensated for the magnitude and phase distortion thereof according to channel estimating information previously stored. The PCB pattern detector 217 detects the PCB pattern from the despread signal and uses the detected PCB pattern to determine which transmit antenna is currently used to transmit the input signal.

Here, the PCB pattern detector 217 is composed of antenna pattern generators 218 and 219, multipliers 220 and 221, integrators 222 and 223, and a detector 224. The antenna pattern generators 218 and 219 generate corresponding antenna patterns. The multiplier 220 multiplies the output of the PCB extractor 216 by the output of the first antenna pattern generator 218. In contrast, the multiplier 221 multiplies the output of the integrator 215 by the output of the second antenna pattern generator 219. The first integrator 222 integrates the output signal of the multiplier 220 and dumps the integrated signal, while the second integrator 223 integrates the output of the multiplier 221 and dumps the integrated signal. The detector 224 determines a true transmit antenna from the output signals of the integrators 222 and 223 and provides the result to a system controller (not shown). Here, the detector 224 output provided to the system controller is used to obtain channel estimating information, which is in turn used to compensate the received signal for length and phase distortion. Thereafter, the output signal from the demodulator is restored to the original data through a decoding process.

Next, a more detailed description will be made in connection with FIG. 2 to describe the operation of the mobile station for detecting a PCB pattern to determine a data transmit antenna.

First, the receiver 211 converts a radio frequency signal, received from the base station via the antenna, to a base band signal. The complex PN despreader 212 complex-number multiplies the output of receiver 21 1 by the PN codes PN_I and PN_Q to perform a complex PN despread. The multiplier 213 multiplies the output signal of the complex PN despreader 212 by the orthogonal codes generated from the orthogonal code generator 214 to perform an orthogonal despread. The integrator 215 sums the output of the multiplier 213 for a symbol interval to generate a value for symbol estimation. The PCB extractor 216 extracts a PCB signal from the output signal of the integrator 215 and outputs the extracted PCB signal to the PCB pattern generator 217. Also, the PCB extractor 216 sends the output signal of the integrator 215 to the demodulator 225.

Next, a more detailed description will be provided describing the operation of the PCB pattern detector 217 for detecting a PCB pattern corresponding to a particular transmit antenna.

First, the antenna pattern generators 218 and 219 generate antenna patterns which correspond to the antenna patterns being generated at the base station. As described above, it is assumed that a first antenna pattern is "00" and a second antenna pattern is "+1−1". The multiplier 221 multiplies the output of the integrator 215 by "+1+1", i.e., the output of the first antenna pattern generator 218. In contrast, the multiplier 221 multiplies the output of the PCB extractor 216 by "+1−1", i.e., the output of the second antenna pattern generator 219. The first and second integrators 222 and 223 integrate the output signals of the multipliers 220 and 221, respectively, and dump the integrated signals.

Then, the detector 224, receiving the integrated signals, detects the true transmit antenna pattern from the output signals of the integrators 222 and 223 and informs the system controller (not shown) of the result.

Hereinafter, the antenna pattern detecting method will be described with reference to Table 1, assuming that the transmit antenna is the first antenna. First, the detector 224 is aware of the punctured position of the PCB in the received signal and therefore reads out a data value for the punctured position from the output signals of the integrators 222 and 223. When the data value at the punctured position is equal to the value of the antenna pattern multiplied by the output of the integrator 215 at the previous stage, the current input signal is considered as the signal transmitted via the transmit antenna. That is, the PCB pattern detector 217 detects the antenna pattern using the orthogonality of the PCB pattern.

Here, information about the transmit antenna provided to the system controller is used to acquire channel estimating information, which is in turn used at the demodulator 225 to compensate the received signal for magnitude and phase distortion. Finally, the demodulator 225 uses the channel estimating information to compensate the output signal of the integrator 215 for length and phase distortion. Thereafter, the output signal from the demodulator 225 is restored to the original data through a decoding process.

Although the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A device for communicating data between a base station having at least two transmit antennas, and a mobile station having at least one receive antenna in a mobile communication system, the device comprising:

a transmitter at the base station, for inserting power control bit (PCB) pattern into the data and sending the data with the PCB pattern inserted therein, the PCB pattern indicating one transmit antenna being used to transmit the data; and a receiver at the mobile station, for receiving the data, detecting the PCB pattern from the received data and determining the one transmit antenna from the detected PCB pattern.

2. The device as claimed in claim 1, wherein the transmit antenna determines which PCB pattern is to be transmitted.

3. The device as claimed in claim 2, wherein the PCB pattern is generated at a PCB pattern generator and the PCB pattern generator having at least two antenna pattern generators, each antenna pattern generator generating orthogonal antenna pattern with each other.

4. A base station transmitter, having at least two transmit antennas in a mobile communication system, comprising:

a PCB pattern generator for generating PCB patterns indicative of a transmit antenna;

a PCB inserter for inserting the PCB patterns into data;

a spread modulator for spread-modulating the data with the PCB pattern inserted therein; and a switch for switching the spread-modulated data to the transmit antenna.

5. The base station transmitter as claimed in claim 4, wherein the PCB pattern generator comprises:

at least two pattern generators for generating antenna patterns corresponding to the respective transmit antennas;

a selector for selecting the corresponding antenna patterns according to an antenna select control signal; and a multiplier for multiplying PCBs for controlling transmission power for a mobile station by the selected antenna patterns and generating the PCB patterns indicative of the one transmit antenna.

6. The base station transmitter as claimed in claim 5, wherein the transmit antenna determines the PCB patterns transmitted from the base station.

7. The base station transmitter as claimed in claim 5, wherein the antenna patterns are orthogonal with each other.

8. A mobile station receiver, which receives data from one transmit antenna from among at least two antennas in a mobile communication system, comprising:

a PCB signal extractor for receiving the data including PCB signal indicative of the transmit antenna and for extracting the PCB signal contained in the data; and a PCB pattern detector for generating antenna patterns for distinguishing between the at least two antennas and determining the transmit antenna from the processing the antenna patterns and the PCB signal.

9. The mobile station receiver as claimed in claim 8, wherein the PCB pattern detector comprises:

a plurality of antenna pattern generators for generating the patterns for distinguishing between the at least two antennas;

a plurality of multipliers for multiplying the extracted PCB signal by the patterns of the respective antenna pattern generators; and a detector for identifying the transmit antenna according to output signal levels of the multipliers.

10. The mobile station receiver as claimed in claim 9, wherein the transmit antenna determines which PCB pattern is to be transmitted.

11. The mobile station receiver as claimed in claim 9, wherein the antenna patterns are orthogonal with each other.

12. A method for communicating data between a base station having at least two transmit antennas, and a mobile station having at least one receive antenna in a mobile communication system, the method comprising the steps of:

inserting PCB patterns by the base station into the data and sending the data with the PCB pattern inserted therein to the mobile station, the PCB patterns indicating one transmit antenna being used to transmit the data; and receiving the data by the mobile station to detect the PCB patterns from the received data and determine the one transmit antenna from the detected PCB patterns.

13. The method as claimed in claim 12, wherein the transmit antenna determines the PCB pattern to be transmitted.

14. The method as claimed in claim 13, wherein the PCB pattern is generated at a PCB pattern generator and the PCB pattern generator having at least two antenna pattern generators, each antenna pattern generator generating orthogonal antenna pattern with each other.

15. A method for transmitting data from a base station having at least two transmit antennas in a mobile communication system, comprising the steps of:

generating PCB patterns identifying transmit antenna being used to transmit the data from among the at least two transmit antennas;

inserting the PCB patterns into the data;

spread-modulating the data with the PCB pattern inserted therein; and switching the spread-modulated data to the transmit antenna for transmission therefrom.

16. The method as claimed in claim 15, wherein the PCB pattern generation comprises the steps of:

generating a plurality of antenna patterns wherein each pattern corresponds to one of the at least two transmit antennas;

selecting one of said plurality of antenna patterns according to an antenna select control signal; and multiplying PCB for controlling transmission power for a mobile station by the selected antenna pattern and generating a PCB pattern indicative of the transmit antenna.

17. The method as claimed in claim 16, wherein the transmit antenna determines the PCB pattern generated.

18. The method as claimed in claim 16, wherein the PCB patterns are orthogonal with each other.

19. A method for receiving data from one base station transmit antenna out of at least two base station transmit antennas at a mobile station in a mobile communication system, comprising the steps of:

receiving the data including PCB pattern indicative of the transmit antenna and extracting the PCB signal from the data; and generating antenna patterns for distinguishing between the at least two antennas and determining the base station transmit antenna from processing the antenna patterns and the PCB signal.

20. The method as claimed in claim 19, wherein the step of determining the base station transmit antenna comprises:

generating an antenna pattern for each of the at least two antennas to distinguish therebetween;

multiplying the extracted PCB signal by each of the respective generated antenna patterns; and determining the one transmit antenna according to relative signal levels obtained by multiplying step.

21. The method as claimed in claim 20, wherein the transmit antenna determines the generated PCB pattern.

22. The method as claimed in claim 20, wherein the antenna patterns according to the transmit antenna are orthogonal with each other.

\* \* \* \* \*

UNITED STATES PATENT AND TRADEMARK OFFICE
CERTIFICATE OF CORRECTION

PATENT NO. : 6,360,080 B1  
DATED : March 19, 2002  
INVENTOR(S) : Yu-Suk Yun et al.

It is certified that error appears in the above-identified patent and that said Letters Patent is hereby corrected as shown below:

<u>Title page,</u>
Item [75], should read as follows:
-- Yu-Suk Yun; Jae-Min Ahn; Soon-Young Yoon, all of Seoul (KR) --

Signed and Sealed this

Fifth Day of November, 2002

Attest:

Attesting Officer

JAMES E. ROGAN
Director of the United States Patent and Trademark Office